UNITED STATES PATENT OFFICE.

OTTO CARL STRECKER, OF MENTZ, GERMANY, ASSIGNOR TO JOS. SCHOLZ, OF SAME PLACE.

PROCESS OF PREPARING ALUMINIUM PRINTING-PLATES.

SPECIFICATION forming part of Letters Patent No. 597,366, dated January 11, 1898.

Application filed July 10, 1894. Serial No. 517,143. (No specimens.)

*To all whom it may concern:*

Be it known that I, OTTO CARL STRECKER, a subject of the Grand Duke of Hesse, residing at Mentz, Germany, have invented certain new and useful Improvements in Processes of Preparing Aluminium Printing-Plates, of which the following is a specification.

The present invention consists of a process for preparing aluminium plates for lithographic printing. This has hitherto been attained according to my process, covered by Patent No. 516,238, by treating the aluminium plate or sheet-aluminium either previous or subsequent to the application of the drawing or impression with a solution containing phosphoric or hydrofluoric acid, said solution being rubbed onto the plate until a sufficiently-thick coating or precipitation of aluminium salts insoluble in water has been formed. This precipitation or coating has the property of retaining water—*i. e*, absorbing the same and retaining it for a considerable time—thus preventing the spreading of the fatty color when printing. The use of the acids above mentioned does not allow such a slow operation and does not produce such an intense action as the performance of many kinds of work requires.

In the course of my further experiments I have aimed to improve my said process so as to enable the operator to work with more tranquillity and therefore more certainty and of attaining simultaneously a more intense action, which will be visible by a better white color of the metal treated.

I have succeeded in arriving at the objects in view by the present invention, which consists in substituting for the phosphoric or hydrofluoric acid one of the following acids: phosphormolybdic acid, phosphortungstic acid, silicofluorhydric acid, borofluorhydric acid, or their equivalents, or a solution containing a mixture of two or more of the said acids, or in which one or a mixture of several of the said acids will develop. The phosphormolybdic acid and the phosphortungstic acid indicate by change of color the beginning of the layer and work more slowly or with more delay. The silicofluorhydric acid and the borofluordydric acid furnish a film, coating, or precipitation on the aluminium, because the acids are decomposed by the action of the excess of aluminium metal. The salts consisting of aluminium and silico or boro fluorhydric acid are very nearly insoluble in water. These coatings resulting from the application of silico or boro fluorhydric acid are identical with those obtained by the use of hydrofluoric acid; but by the use of the silico or boro fluorhydric acid in lieu of the hydrofluoric acid, which is a very disagreeable material, the operator is not subjected to the noxious influence of the hydrofluoric acid. These substitute acids are used in two ways, in the same manner as explained in my prior patent above referred to, according to whether the precipitation is to be produced previously or subsequently to the application of the drawing or impression.

If it is desired to produce the precipitation previously to the application of the drawing, the plate previously ground up by means of sand and finely-pulverized pumice-stone is continuously rubbed over with a solution containing one or a mixture of several of the above acids or in which one or a mixture of several of the above acids will develop, until the acid has dissolved sufficient of the metal and formed a salt therewith, which remains on the plate as a whitish precipitation. The acid solution, which should advantageously be a twenty-per-cent. one, must be applied to the plate in such a manner as to prevent the formation of bubbles. As soon as the precipitation is sufficiently thick it should be carefully washed over, so as to remove the excess of acid, after which any remaining traces of acid should be neutralized by a solution of alum or its equivalent. After this neutralization has taken place the plate should be allowed to dry, after which the drawing or impression may be produced on the same. When the drawing or representation has been completed, one of the following acid mixtures, given as examples, should be applied to the plate.

First. Nine grams borofluorhydric acid or silicofluorhydric acid or silicohydrofluoric acid, one hundred and thirty grams gum-arabic, eight hundred and sixty-one grams water; total, one thousand grams.

Second. Eight grams phosphormolybdic acid or phosphortungstic acid, one hundred and thirty grams gum-arabic, eight hundred and sixty-two grams water; total, one thousand grams.

These solutions may also be made with gallic acid, (twenty-five grams,) in which case a correspondingly smaller amount of water must be used.

The solution is applied with a fine soft rag very thinly and lightly, care being taken that no bubbles occur. The application should be accomplished by uninterrupted rubbing and very quickly. The acid mixture (etcher or corrosive) should then be removed at once and the plate be washed off with a little water and then allowed to dry, when it will be ready for printing.

If it is intended to apply the drawing or representation first and then to develop the precipitation, the process should be carried out in the following manner: The drawing or the like is first applied to the plate, the color rubbed on, dried and powdered, (with talc,) and the plate then rubbed over in the manner previously described with an acid solution composed as described under the headings 1 and 2. After rinsing with a little water and having been allowed to dry, color is again rolled onto the plate, powdered, and the plate again rubbed over with a stronger acid solution in order to increase the precipitation. This second solution should contain the same constituent parts as the first, but fifteen grams more of the silicofluorhydric acid, (or an equivalent amount of the other acids,) and correspondingly less water. As soon as the precipitation is sufficiently thick the stronger solution should be rubbed off at once and the plate rinsed with a little water. After having been allowed to dry the plate is ready for printing.

I wish it to be understood that the proportions given need not be adhered to exactly, but may vary within certain limits.

Having fully described my invention, what I claim as new, and desire to secure by Letters Patent, is—

1. A process for preparing aluminium plates for lithographic printing, consisting in rubbing onto the plate of metal, before having produced the drawing, print or representation, a solution containing phosphormolybdic acid, phosphortungstic acid, silicofluorhydric acid, borofluorhydric acid, or their equivalents, or a suitable mixture of two or more of the said acids, thus producing a precipitation of aluminium salts insoluble or very nearly insoluble in water, and then, after having applied the drawing, print or representation to the said precipitation, rubbing again onto the plate a solution containing the above acid or acids, and gum-arabic, but of less strength, substantially as described.

2. A process for preparing aluminium plates for lithographic printing, consisting in rubbing onto the plate of metal, after having produced the drawing, print or representation and powdered the same, a solution containing phosphormolybdic acid, phosphortungstic acid, silicofluorhydric acid, borofluorhydric acid or their equivalent or a suitable mixture of two or more of the said acids, and gum-arabic, thus producing a precipitation of aluminium salts insoluble or very nearly insoluble in water, and then after having color rolled onto the plate and again powdered, rubbing again onto the plate a solution containing the above ingredients, but more of the said acid or acids, substantially as described.

In testimony whereof I have signed my name to this specification in the presence of two subscribing witnesses.

OTTO CARL STRECKER.

Witnesses:
AD. BARTZACT,
CARL ED. HAHN.